[19] United States Patent
Sharp et al.

[11] 3,767,498
[45] Oct. 23, 1973

[54] METHOD OF MAKING CAPILLARY INSULATION PANELS

[75] Inventors: Richard A. Sharp, Lakewood; Jay L. McGrew; John P. Gille, both of Littleton; Eugene C. Mowrey, Denver; David L. Buskirk, Littleton, all of Colo.

[73] Assignee: Martin Marietta Corporation, Denver, Md.

[22] Filed: Oct. 16, 1970

[21] Appl. No.: 81,442

[52] U.S. Cl. .......................... 156/94, 62/45, 156/71, 156/78, 156/285, 161/68, 161/113, 161/127
[51] Int. Cl. .............................................. F17c 1/00
[58] Field of Search ........................ 156/285, 64, 71, 156/87, 94, 98; 161/68, 109, 112, 113, 127, 139; 62/45

[56] References Cited
UNITED STATES PATENTS

| | | | |
|---|---|---|---|
| 2,941,759 | 6/1960 | Rice | 161/113 X |
| 3,186,895 | 6/1965 | MacDonald | 156/285 X |
| 3,067,507 | 12/1962 | Titus | 156/285 |
| 3,365,897 | 1/1968 | Middleton | 62/45 |
| 3,461,678 | 8/1969 | Klipping | 62/45 |
| 3,490,977 | 1/1970 | Lincoln | 156/285 |

Primary Examiner—Robert F. Burnett
Assistant Examiner—M. E. McCamish
Attorney—Phillip L. DeArment and Gay Chin

[57] ABSTRACT

Insulation panels are for use in providing a gas insulation layer between a surface and a liquid having a low boiling temperature. The insulation comprises a cellular or honeycomb core having a plurality of discrete cells enclosed by a capillary cover with capillary openings communicating with each cell. The honeycomb core is tensioned and also is shaped to an arcuate or concave configuration before the capillary cover is adhesively secured thereto. The adhesive forms a smoothly radiused joint between the core walls and the capillary cover with the adhesive being feathered on the cover and the walls immediately adjacent the joint. Vacuum is applied to each cell to form a dimple in the capillary cover and the capillary openings are then formed in the cover. A filler material may be placed in each cell and a backing sheet applied to the core to maintain the filler in the cells and facilitate assembly of the panel to the surface to be insulated. Each cell may be tested individually by applying a vacuum to the capillary opening associated with that cell and, if a leak between the capillary cover and the core is detected, the portion of the cover over that cell may be removed and a predimpled cover patch secured over the cell.

7 Claims, 7 Drawing Figures

PATENTED OCT 23 1973

INVENTORS
RICHARD A. SHARP
JAY L. McGREW
JOHN P. GILLE
EUGENE C. MOWREY
DAVID L. BUSKIRK

BY Yount and Tarolli
ATTORNEYS

PATENTED OCT 23 1973 3,767,498
SHEET 2 OF 3

INVENTORS
RICHARD A. SHARP
JAY L. McGREW
JOHN P. GILLE
EUGENE C. MOWREY
DAVID L. BUSKIRK
BY Yount and Tarolli
ATTORNEYS

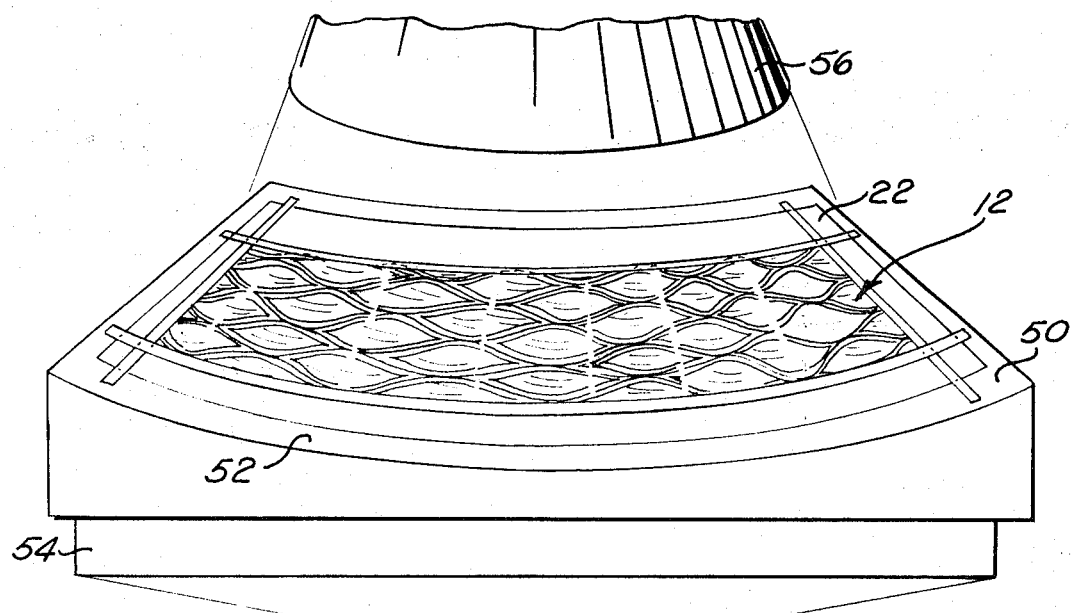
FIG. 5
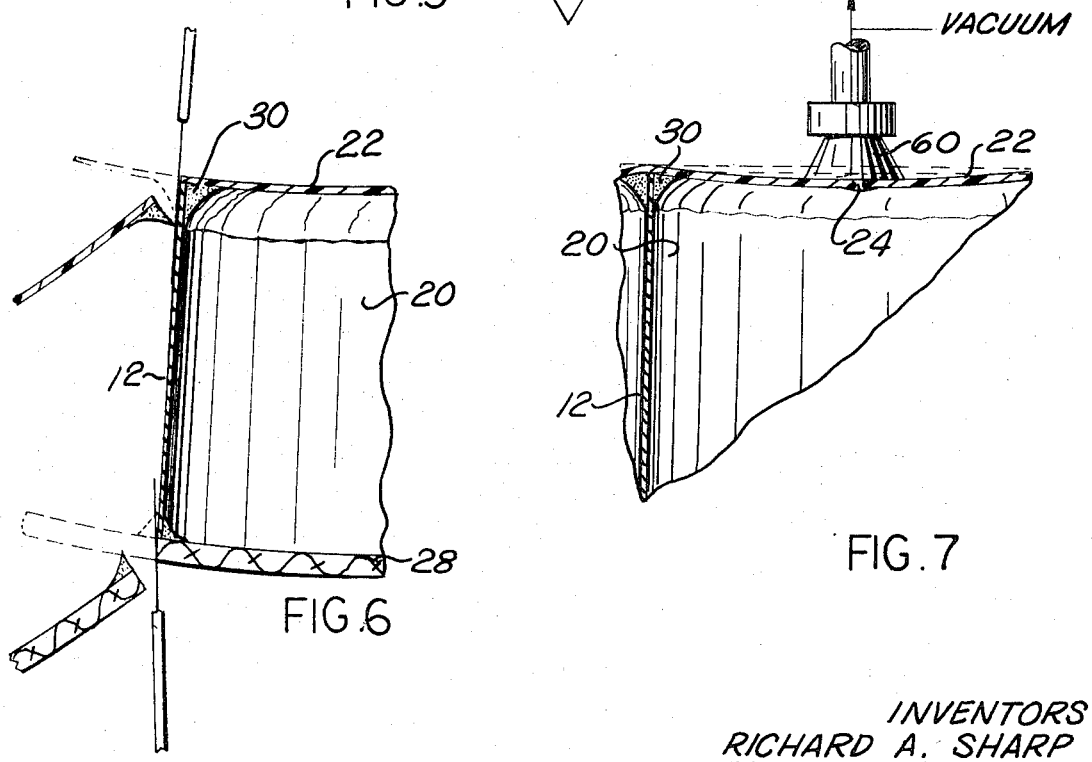
FIG. 6
FIG. 7

METHOD OF MAKING CAPILLARY INSULATION PANELS

The invention described herein was made in the performance of work under a NASA contract and is subject to the provisions of section 305 of the National Aeronautics and Space Act of 1958, Public Law 85–568 (72 Stat. 435; 42 U.S.C. 2457).

This invention relates to the field of insulation and, more particularly, to an improved insulation for providing a gas insulating layer between a surface and a liquid having a low boiling temperature and to a method of manufacturing same.

The handling and storing of liquids having a low boiling temperature such as liquid nitrogen or liquid hydrogen have presented substantial problems. One particularly troublesome problem relates to the need for a suitable insulation which is relatively inexpensive but which is extremely effective. There is disclosed in copending application Ser. No. 44,678, filed June 9, 1970, and assigned to the assignee of this invention, a new concept in insulation for liquids having a low boiling temperature and which appears to be a practical and effective solution to the insulation problems relating to the insulation of such liquids. As disclosed in that application, the insulation comprises a cellular or honeycomb core which provides a plurality of discrete cells in which a gas column may be established between the surface to be insulated and the body of the liquid. A capillary cover substantially closes the liquid side of each cell with the cover having at least one capillary opening per cell. The capillary openings are so designed that a stable capillary gas-liquid interface or membrane is formed in each opening. The gas columns in each cell and their associated stable gas-liquid interfaces insulate the liquid from a surface, such as the walls of a container for the liquid. In addition, the gas columns in the cells support the liquid in the container thereby permitting fabrication of the honeycomb core from materials which have low structural strength, and thus may be light in weight.

However, because of the low structural strength of the materials from which the insulation is constructed, care must be taken in assembling the insulation to, for example, the walls of a tank, so that the honeycomb core is not crushed or collapsed. This problem becomes particularly acute when the insulation panel must be shaped to conform to curved surfaces and particularly those which may have a compound curvature. In addition, it is important to construct the insulation panel in such a manner that points of potential stress concentration are minimized to the extent possible so that stresses imposed on the core due to the substantial thermal gradient present will not cause the insulation to fail. Still further, it is desirable to fabricate the insulation panels by techniques which are susceptible to mass production thereby enabling the production of such insulation efficiently at the lowest possible cost. Moreover, it is important in the fabrication to provide for shaping of the panels so as to generally conform with the shape of the surface to be insulated.

Accordingly, it is among the objects of this invention to provide an insulation panel of the type heretofore described and which may be assembled over compound curved surfaces without collapsing the honeycomb core and in which points of potential stress concentration, particularly where the cover joins the core, are eliminated.

In addition, it is an object of this invention to provide a method of manufacturing an insulation of the above noted type wherein a stable liquid-gas interface is provided between a gas and a liquid and which may be readily utilized in mass production of the insulation for use with various shaped surfaces.

Still another object of the present invention is the provision of a technique for testing the integrity of each cell in the insulation assembly and a technique for repairing any cell in which a leak between any cell and an adjacent cell and between the tank interior and exterior is detected.

More specifically, and in accordance with one principal aspect of this invention, there is provided an insulation panel assembly which comprises a honeycomb core formed by a plurality of strips or ribbons of material arranged on edge and interconnected to define a plurality of contiguous cells with the strips or ribbons throughout the length and width of the panel being under tension and a cover sheet extending across and secured to the edges of the ribbons. The cover sheet maintains the strips in the tensioned condition so that as the panel is being assembled to a surface any tendency of the strips or ribbons forming the cell walls to collapse is minimized.

In accordance with another aspect of the invention, the capillary cover is secured to the core by a settable adhesive which extends around the periphery of each cell wall with the adhesive extending to a limited extent both along the interior wall surface in each cell and across the interior surface of the cover sheet. The adhesive defines a generally smooth radius at the juncture of the cell walls and the cover sheet and has a feathered configuration on the surfaces of the cell walls and the cover sheet. This feathered configuration of the adhesive eliminates a potential point of stress concentration which would otherwise be present if a sharp or abrupt joint between the adhesive and the cover sheet was formed.

The insulation panel may be constructed by shaping the core to conform somewhat to the surface to be insulated and biaxially tensioning the core in a jig. Then glue is rolled across the edges of the ribbons forming the tensioned core. The core and jig are then inverted onto the surface of the capillary cover. The core remains inverted over the cover for a sufficient period to permit gravity and surface tension effects to cause the glue to form the desired radiused fillet and feathered configuration at the juncture of the cell walls and the cover. Thereafter, the core with the attached cover is removed from the jig and placed in a vacuum box. A vacuum is applied to each cell while, simultaneously, heat is applied to the cover. The combination of vacuum and heat stretches the portion of the cover over each cell beyond its elastic limit, drawing the cover down a small distance into the cell to form a dimple over each cell. The honeycomb core with the dimpled cover is then removed from the vacuum box and inverted and the cells may be filled with an appropriate filler. A backing such as cheese cloth or an impervious material may be applied to the back surface of the core. Also, the capillary cover is pierced to form the desired capillary openings communicating with each of the cells. Copending application Ser. No. 81,400, filed Oct. 16, 1970. assigned to the assignee of the present invention discloses and claims certain aspects of this method.

After formation the integrity of each cell may be tested by the simple technique of applying a vacuum to each of the capillary openings. If the cell is properly constructed, a vacuum of a desired degree should be established. On the other hand, if there is a defective joint between the cover and the core, air will bleed into the cell being tested and a vacuum of the desired degree will not be established. If a leak is detected in any of the cells, it may be repaired with suitable adhesive and patching material. Alternatively, the capillary cover over that cell may be cut out and a cover patch may be secured in its place.

Other objects, features and aspects of the invention will become more apparent upon a complete reading of the following description which, together with the attached drawings, disclosing a preferred form of the invention. Turning now to the drawings, wherein the reference numerals indicate like parts in the various views:

FIG. 5 illustrates the step of applying heat and vacuum to the assembled core and cover;

FIG. 6 illustrates the step of trimming excess material from the panel; and

FIG. 7 is a fragmentary sectional view of the insulation panel as one of the cells is being tested.

Figure 1:
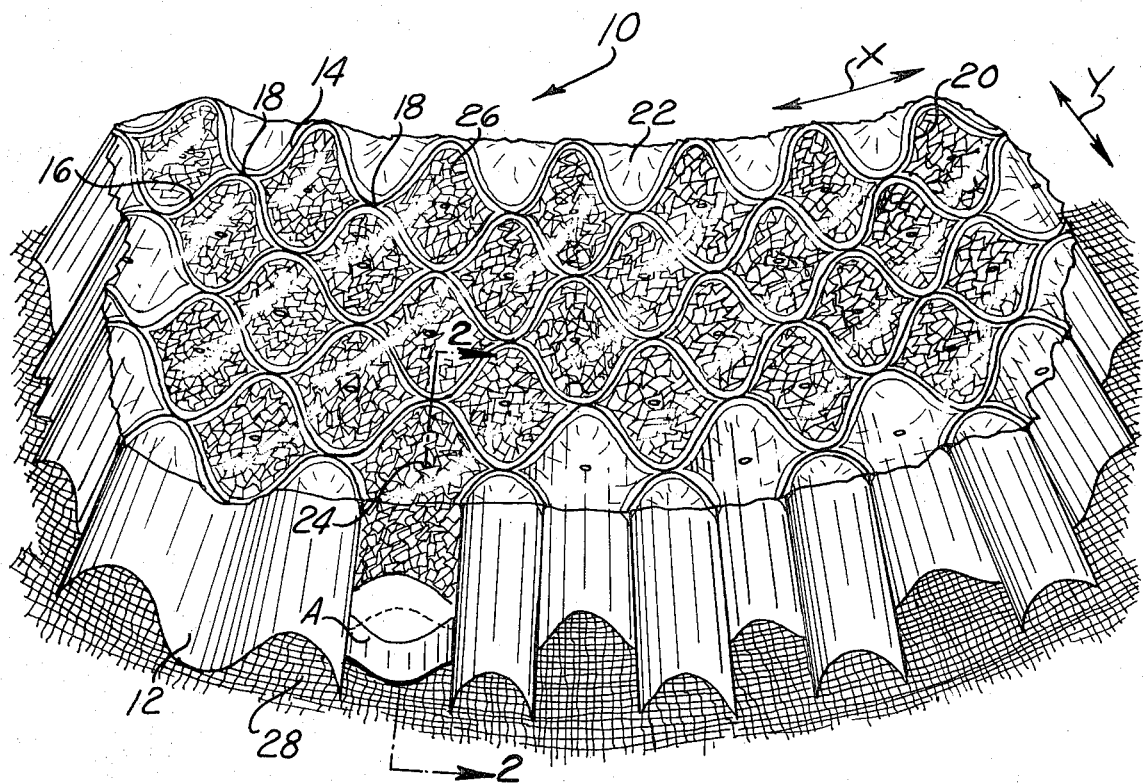
FIG. 1 is a perspective view of a portion of an insulation panel assembly constructed in accordance with the principles of the invention.

Referring now more in detail to the drawings where the showings are for the purposes of illustrating a preferred embodiment only, there is illustrated in FIG. 1 a portion of an insulation panel assembly, indicated generally by the reference numeral 10, constructed in accordance with the principles of this invention. The panel assembly 10 comprises a cellular or honeycomb core 12 which may be fabricated from a wide variety of flexible materials having low thermal conductivity. For example, either Kraft paper or Nomex, which is a nylon paper dipped in a suitable resin may be employed. The cellular core may be constructed by assembling a plurality of strips or ribbons of the material on edge and securing them together at spaced points to interconnect the strips one to the other. Thereafter, by expanding the interconnected strips, the cellular core assumes a configuration generally as shown in FIG. 1 wherein each strip, for example, strip 14, is connected to the next adjacent strip, for example, strip 16, at spaced points or nodes 18. Each strip has a wave form or undulating cross-sectional configuration with the adjacent strip cooperating to define cells 20 therebetween.

The panel assembly 10 further includes a capillary cover 22 extending over and secured to one of the surfaces and substantially enclosing one end of the cells 30. This capillary cover is made of a highly flexible material such as one mil Mylar film. Capillary openings 24 are formed in the capillary cover with at least one opening per cell.

A packing or filler material 26 may be provided in each cell 20 to reduce the convection and radiation within the cells. This filler material, which preferably is lightweight, inexpensive and of a low thermal conductivity, may be of a wide range of materials such as polystyrofoam chips, rock wool, fiberglass or similar material.

After the filling has been positioned in the cell, a suitable packing A is inserted in the cell. The packing is preferably a substantially resilient material such as a fiber glass packing which functions similarly to a spring to fill up the cell and keep the filler material chips in position against the Mylar covering. This packing minimizes the problem which is created if the packing is absent due to settling of the chips in the cell. Such settling of the chips in the absence of the packing could provide voids or spaces in the cells which would affect the insulation properties of the cell.

The panel assembly is completed by an appropriate backing sheet 28 which is secured to the cellular core on the surface opposite to the surface to which the capillary cover is applied. The backing sheet may be of a material such as cheese cloth. The backing sheet 28 is secured to the cellular core and serves to retain the filler material 26 and packing A in the cells 20. In addition, when a backing material such as cheese cloth is employed, the assembly of the panel to a vertically extending surface such as a tank wall is materially facilitated. More specifically, the cheese cloth, because of its porous nature, permits the adhesive which is applied to the tank wall to penetrate the cloth thereby resulting in a good bonded relationship between the panel and the wall over the entire length and width of the panel. Moreover, the penetration of the adhesive into the cheese cloth prevents the adhesive from running down the surface of the tank wall.

Although the cellular core 12, without the cover 22 and the backing 28, is readily expansible and contractible, the addition of the cover 22 to the core gives the panel assembly substantial rigidity. In other words, the combination of the core and the cover provides a relatively rigid structure which will resist forces applied in the plane of the panel tending to contract or expand the assembly. Yet, the panel does possess a certain degree of flexibility in planes transverse to the plane of the panel so that the panel may be shaped to conform to a curved surface. However, as noted previously, the cellular core is constructed from flexible material and may have low structural strength.

The cellular core 12 is constructed such that each of the ribbons or strips of material are distorted from their original position prior to the assembly of the capillary cover 22 thereto. The distortion of the ribbons or strips is accomplished by stretching or expanding the cellular core 12 in the direction of the arrow Y in FIG. 1. Expansion of the core in the direction Y causes contraction in the direction X in FIG. 1. The direction Y is perpendicular to the ribbons forming the core. The core is then maintained in its expanded or stretched condition with the ribbons distorted while the cover sheet 22 is applied. The cover sheet then maintains the distorted condition in the strips upon release of the core.

The distortion of the core provides two advantageous functions. First the distortion of the honeycomb core gives the ribbons forming the honeycomb core structure an S-shaped configuration, as illustrated in FIG. 1, and which S-shaped configuration is extremely important, as disclosed and claimed in copending application Ser. No. 81,400, filed Oct. 16, 1970. In general, the S-shaped configuration provides excess material between nodes of the honeycomb construction, thereby resulting in a minimum of stresses being created in the ribbon due to temperature changes. Additionally, the distortion of the honeycomb construction functions to tension the honeycomb core so that shaping of the honeycomb core as well as other assembly steps can be accomplished without buckling of the ribbons of the honeycomb core, and particularly without buckling of the ribbons of the honeycomb core when the Mylar cover sheet 22 is positioned thereon.

Figure 2:
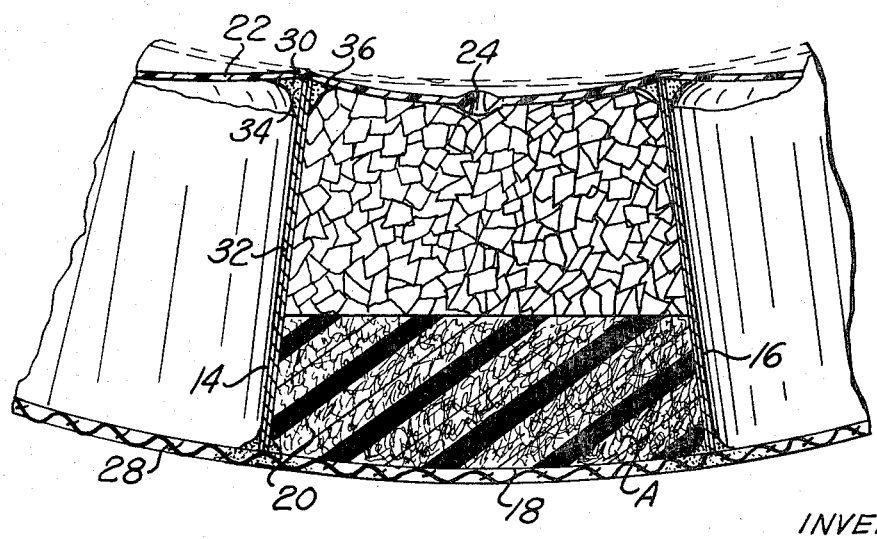
FIG. 2 is a sectional view taken along line 2—2 of FIG. 1.

Another aspect of the panel insulating assembly of the present invention to be noted is the joint formed between the periphery of the cell walls and the capillary cover 22. Referring to FIG. 2, where one typical joint is illustrated in enlarged detail, it will be observed that the adhesive forms a smoothly curved fillet 30 at the juncture between the cover 22 and the upper edge of the cell wall 32. This radiused fillet extends around the entire periphery of the cell and is duplicated in each of the cells throughout the entire cellular core 12. In addition, the adhesive fillet 30 has a smoothly tapering or feathered configuration 34 which extends downward along the interior surface of the cell wall 32. A similar feathered configuration 36 extends along the inner surface of the capillary cover 22. The substantial quantity of adhesive forming the radiused fillet 30 provides a strong point of connection between the capillary cover and the wall 32 with the feathered configurations 34, 36 both on the wall and the cover serving to avoid establishing points of stress concentration.

The panel assembly shown in FIG. 1 is illustrated as being generally arcuate or concave in configuration. By constructing the panel with a pre-established curvature or concave shape corresponding generally to the curvature of the surface to be insulated, the fitting of the panel to the interior wall of a tank or other container is facilitated. However, it is to be understood that neither the tensioned construction of the core nor the particular configuration of the adhesive joint between the capillary cover and the cell wall are dependent on such a configuration. Both of these latter features may be used in an entirely flat or planar or in a generally convex panel.

The method of manufacturing the insulation panel assembly of FIG. 1 will now be described. While certain specific jigs, fixtures and apparatus will be illustrated and described for performing the manufacturing steps it will be appreciated that other equipment might be used as well and the described method is not to be limited to the specific equipment described.

The method of manufacturing the insulation panel contemplates the prior assembly of a suitable cellular core 12 which, as noted previously, is readily contractible or expansible. The expansible cellular core 12 is then assembled in a jig, indicated by the reference numeral 40 in FIG. 3. This jig 40 comprises a supporting frame 43 which, if a concave panel configuration is desired, will have an arcuate generally concave shape. Projecting from the frame 43 around the entire peiphery of the jig 40 are a plurality of uniformly spaced pins 44. These pins, which may be Teflon coated, are of a dimension which permits them to be received in the cells 20 around the periphery of a core 12 and are of a height such that they extend into, but not entirely through the cells. Positioning the core 12 on the pins and the frame 43 will result in the core 12 being shaped to the concavity of the frame 43, which may correspond somewhat to the shape of the surface to be insulated.

Figure 3:
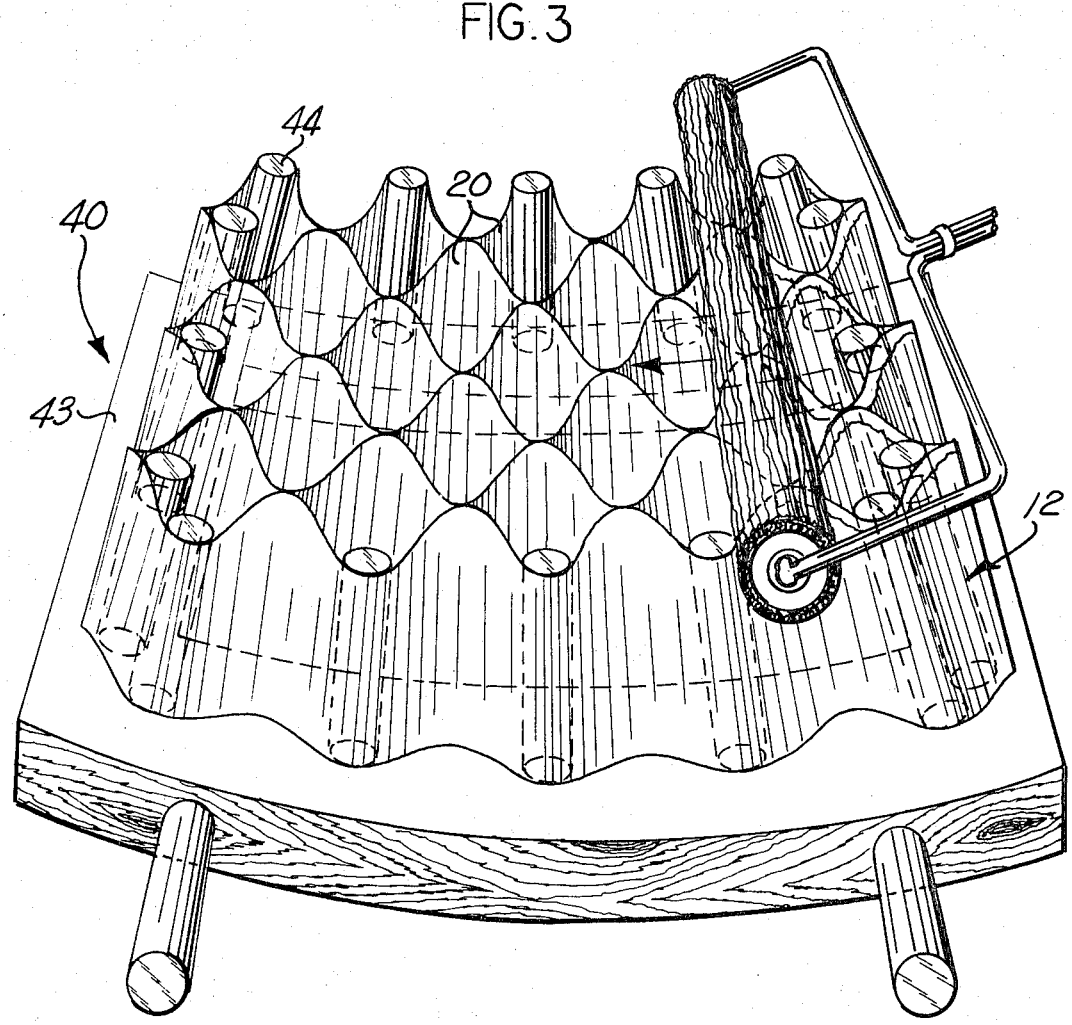
FIG. 3 is a perspective view of the cellular core distorted and having glue applied.

The cellular core 12 is expanded and then assembled over the pins 44 in the manner illustrated in FIG. 3. By expanding the core, the desired distortion of the strips into an S-shape is accomplished. This tensioning or distortion of the core, as noted above, minimizes the possibility of collapse of the ribbons during further manufacturing steps and as well in the event the panel after assembly is bent into a particular curved configuration. Moreover, the uniform spacing of the pins ensures that all of the cells in each panel are of a uniform dimension.

With the cellular core expanded and assembled to the jig 40, a suitable adhesive, such as a polyurethane glue of the type sold under the trademark Crest 7343/7139 is then applied to the upper edges of the ribbons. The application of the adhesive is schematically illustrated in FIG. 2 by the roller 45 but it will be appreciated that other techniques more suitable to mass production may be employed, such as dipping.

Figure 4:
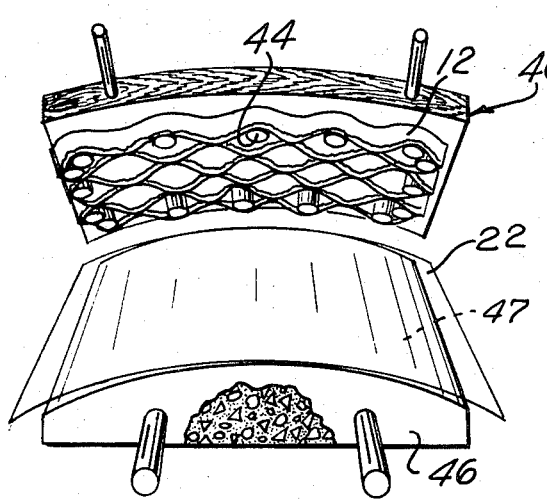
FIG. 4 illustrates the step of attaching the cover to the core.

While the core 12 is being assembled in the jig 40, the capillary cover 22 may also be prepared for assembly to the core. Referring to FIG. 4, the Mylar film or other material from which the capillary cover 22 is to be constructed is cut to an appropriate length and width which should exceed the length and width of the cellular core. The cover is then laid over a form 46 having an upper arcuate convex surface 47 which conforms to the concavity of the frame of the jig 40. The surface 47 should be completely smooth and rigid so that wrinkles or other irregularities in the cover are minimized. A smooth hardened plaster is one suitable material for the form 46 over which the capillary cover may be laid.

With the core 12 assembled in the jig 40 and the adhesive applied, the jig is then inverted and laid over the capillary cover 22 in the manner illustrated in FIG. 3. Suitable pressure is applied to adhere the cover 22 to the edges of the core 12. The jig 40 is maintained inverted over the cover 22 until the adhesive has firmly secured the cover to the cellular core.

These assembly steps are important to providing the proper glue fillet, noted above. In this connection, a liberal amount of adhesive is applied to the cellular core so that with the core inverted over the cover, the adhesive tends to flow down the core walls onto the capillary cover. The effect of gravity on the adhesive, together with surface tension effects, causes the adhesive to form the meniscus illustrated in FIG. 2 around the periphery of each cell wall. In other words, the adhesive flows down the cell wall onto the capillary cover and feathers out along the surface of the cover to form the desired joint between the capillary cover and the cellular core.

Once the adhesive is set, the jig 40 is removed from the form 46, carrying with it the cellular core 12 and the attached cover 22. The core may then be removed from the jig 40 with the cover 22 serving to maintain the core in its expanded, tensioned and shaped condition.

The core assembly 12 is then placed in a vacuum box which may be of any suitable construction. As illustrated in FIG. 5, a vacuum frame 50 has an opening which receives the core assembly with the excess of the cover 22 overlying the upper surface 52 of the frame. This excess cover material is then secured to the vacuum frame by appropriate means such as a zinc chromate tape. By securing the cover 22 to the vacuum frame, any tendency of the cellular core to collapse under the vacuum which is subsequently applied is minimized.

The vacuum frame 50 with the cellular core is then placed over a suitable vacuum box 54 with the construction of the box being such that vacuum is applied to each of the cells 20 in the cellular core. The vacuum is then applied to produce a dimple or other suitable deformation in the portions of the cover over each of the cells. This is accomplished by pulling the cover over each cell down into the cell a small distance and thereby stretching the cover beyond its elastic limit so that when the vacuum is removed a permanent deformation in the form of a small dimple is formed in the portion of the cover over each cell. To facilitate the dimpling of the cover, heat is applied in the form of hot air from a suitable source 56. These steps are described in detail in application Ser. No. 81,400, filed Oct. 16, 1970.

The feathered configuration of the adhesive at the joints between the core and cover is particularly important in view of the stresses placed in the cover by this dimpling step. As the heated and dimpled cover cools, it contracts resulting in stresses at the joint between the cover and the core. However, because of the feathered configuration, these stresses are spread over the entire joint instead of being concentrated at one point as would be the case if a relatively sharp or abrupt joint between the cover and the adhesive were formed. More importantly, however, when the liquid to be insulated contacts the cover 22, the cover tends to contract and take the dotted position shown in FIG. 2. The glue fillet eliminates any stress riser which might result therefrom.

Upon completion of the dimpling step, the vacuum frame is removed from the vacuum box 54 and inverted thereby exposing the under side of the cellular core. The filler material such as the polystyrofoam chips are then placed in the cells 20. A backing such as cheese cloth is then applied. This is accomplished by wetting the cloth with adhesive, wringing the cloth out to a nearly dry state, stretching the cloth tight, laying the cloth over the core while maintaining tautness, applying a separator film applying a caul sheet to distribute pressure without a dimple, and applying pressure to the caul sheet with a vacuum bag and then cure. This process provides a flat well-bonded back having an open mesh which facilitates attachment of the panel to the container wall.

The core is then removed from the vacuum frame and the excess cover material and the excess backing material are trimmed from the core 12 with a suitable tool such as a hot knife. Thereafter, the capillary openings 24 are placed in the cover 22 by piercing the cover with a heated needle. It should be apparent of course, that the cover 22 may be pierced immediately after dimpling. This step completes the assembly of the insulation panel.

The integrity of the joint between the capillary cover and each cell in the cellular core may be tested by applying a vacuum to the capillary opening 24 over each cell. This is illustrated in FIG. 7 wherein a vacuum cup 60 is applied to the capillary cover over the capillary opening 24. The vacuum cup 60 is connected to a source of vacuum and a suitable gauge which, upon application of vacuum to the cell, should register the presence of a vacuum of a predetermined degree in the cell. If such a vacuum is not indicated on the gauge, then a leak is present. By applying the vacuum to each capillary opening over each cell, the entire panel can be checked. Of course, the described testing procedure can not be employed if a porous backing such as cheese cloth is used on the panel. However, the same testing procedure could be used to inspect even a panel having a cheese cloth backing once the panel has been adhesively secured to a tank wall.

The leakage detection device comprises two calibrated flow restrictors placed in series in a tube between a vacuum pump and an atmospheric vent opening. Connected by a T between the orifices provided by the restrictors is a vacuum gauge and a hose with a probe on the end thereof. When properly calibrated, a small predetermined vacuum will be applied to the cell being tested by fitting the probe over the face sheet opening, assuming no leakage of the cell at the back thereof. If a leak exists, the amount of vacuum drawn on the cell will be less than a predetermined value. While the preferred embodiment as described above subjects the cell to a vacuum, the same principle can be utilized but with a small pressure pump rather than a vacuum pump and wherein a small pressure is applied to the cell under test.

In the event a leak is detected in any one of the cells, the leaking cell can either be blocked up or the portion of the capillary cover over that cell can be removed by a knife and a patch, possibly redimpled and conforming to the configuration of the cell may then be adhesively secured in its place.

While the panel assembly and the method of manufacturing and testing the same have been disclosed in connection with a preferred embodiment, it is to be appreciated that neither the illustrated embodiments nor the terminology employed in describing it is to be limiting; rather, the present invention is intended to be limited only by the scope of the appended claims.

What is claimed is:

1. A method of manufacturing an insulating panel assembly for providing a gas insulating layer between a shaped nonplanar surface and a liquid having a low boiling temperature comprising the steps of,
   providing a honeycomb core structure having a plurality of contiguous cells,
   shaping said honeycomb structure into general conformance with the shape of the nonplanar surface,
   securing a covering to said honeycomb structure for closing one end of the cells and which maintains the honeycomb structure in said shape,
   forming openings in said covering for providing a stable capillary gas-liquid interface between the liquid and the gas,
   said covering comprising a sheet of material and said honeycomb structure comprising a series of ribbons, and wherein the step of securing said covering to the honeycomb structure includes the step of,
   positioning said sheet in a smooth form on a support,
   applying adhesive to the upper edges of said honeycomb structure,
   inverting the shaped honeycomb structure with the adhesive applied thereto and placing said upper edges on the cover sheet, and maintaining the honeycomb structure inverted on said cover sheet while the adhesive flows to form a genrally smooth radius at the joint between the cover sheet and the core.

2. The method of claim 1 further including the step of distorting said ribbons prior to securing the covering to said core by positioning the honeycomb structure in a jig having a plurality of pins which are positionable within the cells on the periphery of the honeycomb structure and which are located a distance apart which is greater than the unstressed dimension of the honeycomb structure, and stretching the honeycomb structure over said pins to effect the distortion thereof.

3. A method of manufacturing an insulation panel assembly for providing a gas insulating layer between a surface and a liquid having a low boiling temperature comprising the steps of,
providing a honeycomb core structure defined by a plurality of ribbons which are interconnected to form a plurality of contiguous cells,
closing the ends of said cells with a covering,
forming openings in said covering for providing a stable capillary gas-liquid interface between the liquid and the gas,
applying a vacuum to an opening in the covering, and
detecting the presence or absence of leaks in the cell associated with the opening.

4. The method of claim 3 and further including the step of repairing each cell in which leakage is detected.

5. The method of claim 3 wherein the step of applying a vacuum to the cells comprises the steps of,
positioning a cup over the opening in the cover sheet, and
communicating the interior of the cup to a source of vacuum.

6. A method of manufacturing an insulating panel assembly for providing a gas insulating layer between a shaped nonplanar surface and a liquid having a low boiling temperature comprising the steps of,
providing a honeycomb core structure having a plurality of contiguous cells,
shaping said honeycomb core structure into general conformance with the shape of the nonplanar surface,
securing a covering to said honeycomb structure for closing one end of the cells and which maintains the honeycomb structure in said shape,
distorting the honeycomb structure prior to securing the covering thereto and said covering maintaining said core distorted as well as in said shape,
forming openings in said covering for providing a stable capillary gas-liquid interface between the liquid and the gas so that the liquid does not penetrate the cell during steady state conditions,
said honeycomb structure comprising a series of ribbons, and the step of securing said covering to the honeycomb structure including the steps of,
applying adhesive to the edges of said honeycomb structure and positioning said sheet in a smooth form on a support and,
inverting the shaped distorted honeycomb structure with the adhesive applied thereto and placing it on the cover sheet and maintaining the honeycomb structure inverted on said cover sheet while the adhesive flows to form a generally smooth radius at the joint between the cover sheet and the core,
applying a vacuum to each of the cells thereby drawing the cover sheet downwardly into the cells, and
applying heat to the cover sheet while applying the vacuum to form a dimple in the cover sheet over each cell.

7. A method of manufacturing an insulating panel assembly for providing a gas insulating layer between a shaped nonplanar surface and a liquid having a low boiling temperature comprising the steps of,
providing a honeycomb core structure having a plurality of contiguous cells,
shaping said honeycomb structure into general conformance with the shape of the nonplanar surface,
securing a covering to said honeycomb structure for closing one end of the cells and which maintains the honeycomb structure in said shape,
distorting the honeycomb structure prior to securing the covering thereto and said covering maintaining said core distorted as well as in said shape,
forming openings in said covering for providing a stable capillary gas-liquid interface between the liquid and the gas so that the liquid does not penetrate the cell during steady state conditions,
testing each cell by applying a vacuum to the opening in the covering associated with each cell,
detecting the presence or absence of leaks in the cell, and repairing each cell in which a leak is detected,
said repairing step comprises the steps of,
removing the portion of the cover sheet over the cell in which leakage occurs, and
securing a preformed cover sheet patch to the core to replace the portion of the cover sheet removed.

* * * * *